United States Patent
Honein et al.

(10) Patent No.: US 10,522,277 B1
(45) Date of Patent: Dec. 31, 2019

(54) DIAMAGNETIC LEVITATION SYSTEM FOR MEDICAL USE

(71) Applicants: Philip Honein, Billerica, MA (US); Michael Lee Fraim, Rio Rancho, NM (US)

(72) Inventors: Philip Honein, Billerica, MA (US); Michael Lee Fraim, Rio Rancho, NM (US)

( * ) Notice: Subject to any disclaimer, the term of this patent is extended or adjusted under 35 U.S.C. 154(b) by 613 days.

(21) Appl. No.: 15/593,193

(22) Filed: May 11, 2017

Related U.S. Application Data

(63) Continuation of application No. 14/688,947, filed on Apr. 16, 2015, now Pat. No. 9,666,345, which is a continuation-in-part of application No. 13/975,201, filed on Aug. 23, 2013, now abandoned.

(51) Int. Cl.
*H01F 1/00* (2006.01)
*H01F 6/06* (2006.01)

(52) U.S. Cl.
CPC ..................................... *H01F 6/06* (2013.01)

(58) Field of Classification Search
CPC ..... H01F 6/06; H01F 6/00; H01F 6/02; G01R 33/3815; G01R 33/3806
See application file for complete search history.

(56) References Cited

U.S. PATENT DOCUMENTS

| | | | |
|---|---|---|---|
| 3,597,022 A * | 8/1971 | Waldron | F16C 32/0436 310/90.5 |
| 5,153,546 A | 10/1992 | Laskaris | |
| 5,287,026 A * | 2/1994 | Ogihara | B60L 13/10 104/281 |
| 5,375,531 A | 12/1994 | Ogihara et al. | |
| 5,382,904 A | 1/1995 | Pissanetzky | |
| 6,162,364 A | 12/2000 | Tillotson et al. | |
| 6,850,137 B2 | 2/2005 | Bird et al. | |

(Continued)

FOREIGN PATENT DOCUMENTS

WO    WO 2006097785 A1    9/2006

OTHER PUBLICATIONS

Lee, GC, Goodwill, PW, Phuong, K, Inglis, BA. Scott, GC, Hargreaves, BA, Li, L, Chen, AC, Shah, RN, and Conolly, SM; Pyrolytic Graphite Foam: A Passive Magnetic Susceptibility Matching Material; J Magn Reson Imaging. Sep. 2010; 32(3): 684-691.

(Continued)

*Primary Examiner* — Bernard Rojas
(74) *Attorney, Agent, or Firm* — Lanier Ford Shaver & Payne, PC; Gerald M. Walsh

(57) ABSTRACT

A diamagnetic levitation system having an open torus magnet segment with a pair of arms extending from a central base. The ends of the arms form a gap. The arms are superconducting magnets and the base is an electromagnet. The magnet segment creates a planar magnetic field which forms a flat ellipse as the planar magnetic field crosses from one arm to the other and which is positioned only across the gap. The electromagnet oscillates the planar magnetic field. The magnet segment levitates a diamagnetic object within and/or above the gap. A plurality of magnet segments can be arranged in series to form a levitation system of defined length. The magnet segments are rotatable so that the planar magnetic field may be tilted.

11 Claims, 5 Drawing Sheets

(56) References Cited

U.S. PATENT DOCUMENTS

| | | | |
|---|---|---|---|
| 7,482,154 | B2 | 1/2009 | DePaola et al. |
| 7,597,002 | B2 | 10/2009 | Moser et al. |
| 7,827,993 | B2 | 11/2010 | Cameron et al. |
| 7,859,157 | B2 | 12/2010 | Bauer |
| 8,169,114 | B2 | 5/2012 | Simon |
| 8,317,682 | B2 | 11/2012 | Kawano et al. |
| 8,360,999 | B2 | 1/2013 | Leung et al. |
| 9,124,196 | B1 * | 9/2015 | Honein .................. H02N 15/00 |
| 9,508,478 | B1 * | 11/2016 | Honein .................. H02N 15/04 |
| 2002/0147424 | A1 | 10/2002 | Ostrow et al. |
| 2003/0187320 | A1 | 10/2003 | Freyman |
| 2006/0162452 | A1 | 7/2006 | Moser et al. |
| 2009/0160279 | A1 | 6/2009 | Bauer |
| 2010/0036394 | A1 | 2/2010 | Mintz et al. |
| 2010/0265018 | A1 | 10/2010 | Kruip et al. |
| 2011/0273044 | A1 * | 11/2011 | Simon .................. H02N 15/00 310/90.5 |

OTHER PUBLICATIONS

Douglas et al (Journal of Physics Special Topics; "A2_3 Diamagnetic Levitation of a Human"; Douglas G.J.M, Marshall D.A., Griffiths I., Hands T.O.; Department of Physics and Astronomy, University of Leicester, Leicester, LE1 7RH; Nov. 8, 2011 (https://physics.le.ac.uk/journals/index.php/pst/article/view/430/301).

John Schenck, Med. Phys. 23(6), Jun. 1996, pp. 815-850, "The role of magnetic susceptibility in magnetic resonance imaging: MRI magnetic compatibility of the first and second kinds".

Geim, Andrey, "Everyone's Magnetism", Physics Today, Sep., pp. 36-39, 1998.

Berry, MV and Geim, AK, Of Flying Frogs and Levitrons, Eur. J. Physics, 18: 307-313, 1997.

Liu, Y, Zhu, D, Strayer, DM, and Israelsson, UE, Magnetic Levitation of Large Water Droplets and Mice, Advances in Space Research 45: 208-213, 2010.

* cited by examiner

DIAMAGNETIC LEVITATION SYSTEM FOR MEDICAL USE

CROSS-REFERENCE TO RELATED APPLICATIONS

This application claims priority of U.S. patent application Ser. No. 14/688,947, now U.S. Pat. No. 9,666,345, which claims priority of U.S. patent application Ser. No. 13/975,201, now abandoned, the disclosures of which is incorporated herein by reference.

FIELD OF THE INVENTION

The present invention relates generally to superconducting levitation magnets and, more particularly, to an apparatus and method for levitating a human patient or live tissue using a magnetic field produced by segmented rotatable superconducting magnets.

BACKGROUND OF THE INVENTION

The use of a magnetic field to levitate a diamagnetic material is known in the prior art. Magnets have been used to levitate diamagnetic objects such as water, frogs, peanuts, and the like. Efforts to use magnetic levitation in medical therapy have been attempted. U. S. Patent Application 2009/0292285 discloses a system for reducing pressure on high-pressure load areas of a body, including a plurality of bone anchors and a support structure. For example, metal rods are attached to the hip or shoulder bones to support the weight of the body during the act of sitting or sleeping so that the soft tissue in that local area can maintain circulation. Opposing magnetic fields, produced by anchor coupling elements and support coupling elements levitate the body above the support structure. However, this system requires surgical installation of the rods into the bones. The lengthy time required for ossification and integration of the rod in the bone, and the protrusion of the rod through the skin area, usually produces a serious problem of infection.

U.S. Pat. No. 7,827,993 discloses a magnetic levitation system for immobile patients in a wheelchair. Based on a multi-pole configuration of permanent magnets in the pelvis, a corresponding multi-pole configuration for magnet repulsion is placed below the patient, typically as part of the wheelchair. This levitation system removes the possibility of infection because the magnets are completely mounted against the patient's bone structure and sealed with flesh. The patient will be magnetically levitated while sitting or lying in the opposing magnetic field that is electrically controlled to handle the dynamic load of normal life functions. The combination of an external permanent magnet field and electromagnetic field requires the least amount of stored energy for dynamic control on a device such as a wheel chair. Unfortunately, this system also requires major surgery for implantation of magnets.

U.S. Pat. No. 8,317,682 and U.S. Patent Application 2010/0036394 demonstrate how to use a three dimensional magnetic field to control the movement of a diamagnetic medical device. A strong magnetic field parallel to the gravitational force is used to levitate the medical device in space while smaller magnetic fields perpendicular to the gravitational force are used to overcome drag force of moving the medical device inside a body cavity. Even smaller alternating electromagnetic fields are used to locate the position and orientation of the device in the body and for communication with sensors on the device.

U.S. Pat. No. 6,162,364 discloses a system for diamagnetic manipulation of an object in a surrounding medium in a low gravity environment. If a diamagnetic object is suspended in a fluid that has a lower diamagnetic value than the object, it will move away from the electromagnet when the magnet is turned on. Thus, with a plurality of electromagnets, the position and orientation of the object can be controlled in space.

U.S. Patent application 2006/0162452 discloses an inertial sensor based on diamagnetic levitation. The inertial sensor has a support means and a two dimensional array of permanent magnets. A diamagnetic element faces the array of magnets and through diamagnetic levitation the diamagnetic material constitutes the inertial sensor.

U.S. Pat. No. 6,850,137 discloses an apparatus and method for levitating a diamagnetic material using a magnetic field produced by a superconducting magnet. Concentric superconducting coils produce magnetic fields when energized with current. The magnetic fields of the coils combine to produce an operational magnetic field for levitating the diamagnetic material inside a central bore.

U.S. Pat. No. 8,360,999 discloses a method for suspending a plate to generate vibrations in the plate at approximately 35 Hz with a magnitude of 0.5 g. The plate is suspended with permanent magnetic levitation and the vibrations are created with electromagnetic repulsion and attraction. The method can be used for the treatment or prevention of musculoskeletal indications.

U.S. Pat. Nos. 4,106,488 and 5,043,101 demonstrate the use of sub-micron size ferromagnetic particles coated with an organic polymer carrier to kill cancer cells by intracellularly heating the cell to 45.5 degrees Celsius. The ferromagnetic particles will inductively heat up in a megahertz alternating magnetic field such as generated by an MRI machine. The organic polymer promotes the mobility of the particles in the blood stream and absorption of the particles by the cells. U.S. Pat. No. 6,251,366 demonstrates the use of sub-micron size paramagnetic particles as MM contrast agents. The use of these submicron particles can have a negative effect on hemoglobin so that the blood can build up heat or electrostatic charge with extended exposure to an alternating magnetic field.

At present, there are no suitable diamagnetic levitation systems to levitate a human body for medical treatment and to position the human body, or parts of the human body, within the magnetic field to facilitate treatment and healing.

SUMMARY OF THE INVENTION

The present invention is a diamagnetic levitation system which incorporates an open torus magnet segment having a first arm and a second opposite arm which extend from a base. The free end of the first arm and the free end of the second arm form the gap of the open torus magnet segment. The first arm and the second arm are superconducting magnets and the base is a superconducting magnet or an electromagnet. The open torus magnet segment makes a planar magnetic field which forms a flat ellipse on the ends of the magnetic field as the magnetic field crosses from the free end of the first arm to the free end of the second arm, wherein the magnetic field is positioned only across the gap. The open torus magnet segment levitates a diamagnetic object within and/or above the gap. The superconducting magnet or the electromagnet of the base oscillates the magnetic field in the gap when operated. The open torus magnet segment is rotatable so that the magnetic field is tilted away from an orientation perpendicular to the direction of gravity as the open torus magnet segment is rotated. The open torus magnet segment has a core that ranges from a flattened plane or oval shape of 0.3 to 3 inches maximum thickness at the free ends of the first and second arms to a 6 to 10 inch rectangular cross section at the base.

A chamber may be positioned around the diamagnetic object and has its bottom end positioned in the gap. A plurality of open torus magnet segments is arranged in series to form a diamagnetic levitation system of defined length, for example, of sufficient length to support a human body. Preferably, each of the open torus magnet segments is offset from center by plus or minus 2 to 5 degrees alternating down the length of the series of open torus magnet segments for self-centering of the diamagnetic object in the magnetic field.

An alternate embodiment of the present invention has a first horseshoe-shaped magnet segment and a second opposite horseshoe-shaped magnet segment (pair of magnet segments), wherein the horseshoe-shaped magnet segments are superconducting magnets and are positioned opposite each other with a space therebetween. The first horseshoe-shaped magnet segment has a first arm, a second arm, and a central base portion and the second opposite horseshoe-shaped magnet segment has a first arm, a second arm, and a central base portion. The central base portions are superconducting magnets or electromagnets. The pair of magnet segments forms a planar magnetic field in the space, wherein a north pole of a first arm or a second arm of one of the horseshoe-shaped magnet segments faces an opposite south pole of a first arm or a second arm of the other of the horseshoe-shaped magnet segments.

The pair of magnet segments levitates a diamagnetic object within or above the space. The superconducting magnet or the electromagnet of the base oscillates the planar magnetic field in the space when operated. The first horseshoe-shaped magnet segment and the second opposite horseshoe-shaped magnet segment are rotatable so that the planar magnetic field is tilted away from an orientation perpendicular to the direction of gravity as the first horseshoe-shaped magnet segment and the second opposite horseshoe-shaped magnet segment are rotated; A support for the diamagnetic object is positioned in or near the space. The support is, preferably, a chamber positioned around the diamagnetic object, the chamber having its bottom end positioned in the space. A plurality of the first horseshoe-shaped magnet segments and the second opposite horseshoe-shaped magnet segments may be arranged in series to form a diamagnetic levitation system of defined length. Each of the first horseshoe-shaped magnet segments and the second opposite horseshoe-shaped magnet segments are offset from center by plus or minus 2 to 5 degrees alternating down the length of the series for self-centering of the diamagnetic object in the planar magnetic field.

An advantage of the present invention is a diamagnetic levitation system that levitates a patient safely and comfortably to facilitate treatment and healing of the patient.

Another advantage is a diamagnetic levitation system that provides a chamber to safely position a patient within the magnetic field and that provides a clean or sterile environment.

Another advantage is a diamagnetic levitation system that promotes healing of bed sores and tissue ulcers.

Another advantage is a diamagnetic levitation system that stimulates bone growth to counteract osteoporosis and that stimulates muscle groups to prevent atrophy of damaged nerves.

Another advantage is a diamagnetic levitation system that provides individual control of super, para-, ferro- or diamagnetic nano-particles in the blood stream to kill an identified cancer tumor.

Another advantage is a diamagnetic levitation system that provides for the cloning of human tissue organized into a repair part for an organ such as a valve for a heart or islets for the pancreas.

Another advantage is a diamagnetic levitation system that enhances in-vitro fertilization by guiding the released egg to the fallopian tube or by guiding a fertilized egg to a better place in the uterus instead of landing on an area damaged by scar tissue.

Another advantage is a diamagnetic levitation system that can reduce stress on a baby in the birth canal of its mother by levitating the mother in the magnetic field, and can enhance contractions of the uterus by muscle stimulation with electrical pulses from the magnetic field.

DETAILED DESCRIPTION OF THE INVENTION

Figure 1:
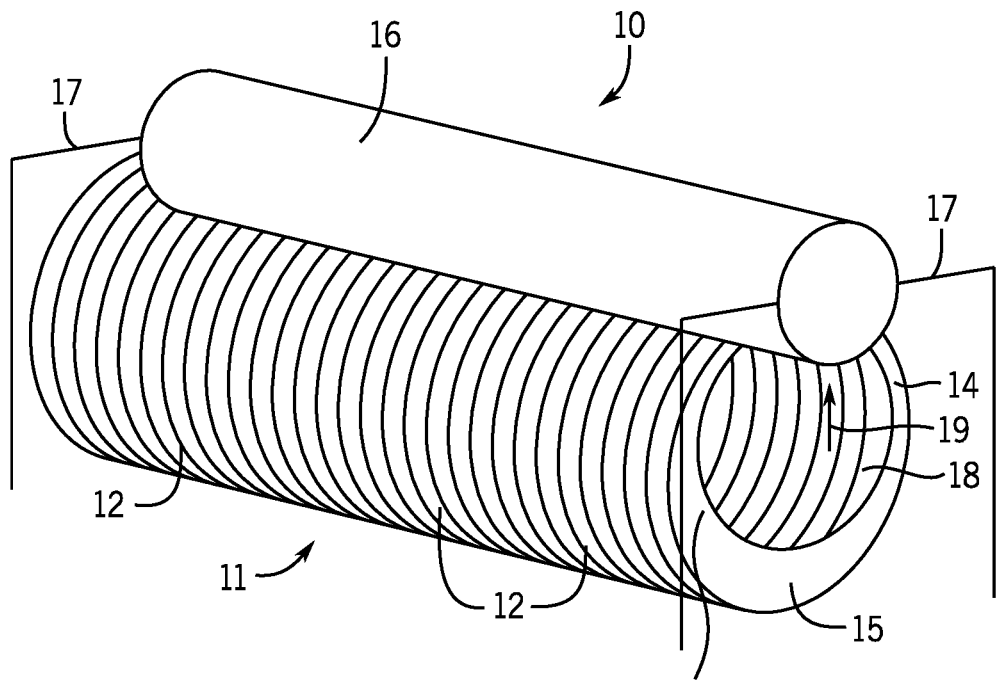
FIG. 1 illustrates the diamagnetic levitation system of the present invention having a large chamber for large objects, such as the human body. A small chamber can be used for cell, tissues, or organs that require nutrient solutions.

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

To prevent tissue ulcers and bed sores, nurses are required to turn the patient in the bed every two hours, but for people that live their lives in a wheel chair, turning over is impossible or impractical. This act of turning is a serious problem for patients that have some form of spinal or neck injury because they do not have the nerve control to shift weight or to even detect that tissue is not receiving blood circulation. Patients with advanced cases of osteoporosis, cerebral palsy, or multiple sclerosis are confined to a motorized wheel chair for daily life, thus increasing the probability of forming decubitus ulcers of the soft tissue under the locally loaded skin area. In patients with advanced cases of diabetes mellitus, blood circulation is reduced at the outer parts of the body. Consequently, continuous application of pressure to any part of the body such as to the buttocks during sitting in a wheel chair or to the points on the shoulder blades during sleeping on the back, a tissue ulcer can form because the cells will die due to the lack of circulation to that area of tissue. Modern memory foam can help reduce the applied pressure to the tissue, but this application of memory foam can only help patients that have a relativity healthy circulatory system.

The present invention provides a levitation system using a very strong magnetic field for diamagnetic levitation of a live patient to promote healing of bed sores or tissue ulcers. A low frequency oscillation in the magnetic field in specific areas of the body can stimulate bone growth to counteract osteoporosis and can internally stimulate muscle groups to prevent atrophy of damaged nerves.

In one application, magnetic levitation is used to suspend a body part in space surrounded by a sterile environment to promote healing of a bed sore or a severe tissue burn. In another application magnetic levitation in combination with a pulsed magnetic field is used to activate muscle fibers with electrical charge to promote circulation to outer tissue, or to provide vibrations to the skeletal structure to prevent bone loss or promote bone growth across a bone fracture. In another application magnetic levitation is used for individual control of super para-, ferro-, or diamagnetic nano-particles in the blood stream to kill an identified cancer tumor in the human body. In yet another application magnetic levitation is used for the cloning of a human tissue organized into a repair part for an organ such as valve for a heart or islets for the pancreas.

Mammalian cells require weightlessness to assimilate into an organ such as skin or for tissue to granulate around an artificial cartilage shape. This invention can provide this weightlessness. The mammalian cells or cartilage shape are transplanted between the skin and the underlying tissue. The underlying tissue includes nerves and blood vessels to support the outer skin covering the transplant. The transplanted tissue requires reintegration of blood supply and nerves. The nerves fibers can be stimulated with pulsed electrical current. The pulse is, preferably, a sinusoidal signal with a swept frequency from 100 to 140 Hz.

This invention uses a chamber to contain the patient or other living matter such as cells, tissues, or organs. To keep the chamber sterile and clean, air jets are used in the bottom of the chamber to transport material towards an exit in one end of the chamber. Ozone or other atomized bactericide can be injected in the chamber to prevent bacterial growth on the surface of wounds of a patient. A portion of the chamber containing the head of human can be isolated from the rest of the chamber for breathing air. The chamber can also be designed for hyperbaric oxygen operation in case there is an occurrence of necrotizing fasciitis.

To target simulation of bone growth in areas of bone loss or bone repair, the skeleton of the patient is flexed with a vibration in the magnetic field. A conventional electromagnet is used to alter the static field strength of open torus superconducting magnet segments, with the electromagnet at the base of each segment. The change in amplitude of the magnetic field strength can provide an offset change in gravitational force of plus/minus 0.25 g at a frequency ranging from 20 Hz to 50 Hz. This diamagnetic levitation system can be used to treat severe cases of osteoporosis by flexing the skeletal structure without having any weight bearing onto weak bone-loss areas.

To target treatment of a tumor, nano-particles with magnetic susceptibility less than water such as carbon nanotubes or pyrolytic carbon can be injected into the blood and collected in the volume around the tumor. The high magnetic field can be used to 'sweep' the particles towards the tumor as they circulate in the blood stream. The particles may include an agent that would allow absorption of the particles by the tumor cells. The particles could provide a timed release of a drug to reduce the tumor size. Also, the particles can be heated with a high frequency magnetic field to kill the tumor with minimal damage to healthy tissue. The particles can be formed with a contrasting agent to be detectable on an NMR scan to verify their general location around the tumor before final treatment.

Transplant tissue could be grown in a weightless environment to form a replacement body organ such as liver or heart valve by using stem cells and a tissue sample from the person. Tissue will not self-organize in a gravity environment, but testing has shown that tissue growth can form three dimensional organs without the influence of gravity. This process can create replacement body parts that would not have the complications of rejection by the immune system.

For nano-particle placement in the body, only certain magnet segments surrounding the chamber are pulsed to herd the particles in the blood stream to a target, such as a tumor inside the body. The magnetic pulses can be timed to enhance blood circulation with muscle contractions. Both the body and magnet segments can be rotated to concentrate the particles in or around three-dimensional targets. Paramagnetic particles can be pulled by the magnetic field to the target while diamagnetic particles can be pushed by the magnetic field to the target.

Alternating magnetic field intensity through the body can generate electrical pulses to activate muscles which are not controlled by the brain due to nerve damage. This activation of muscle is similar to an external electrical pulse or interferential current muscle stimulation except that the electrical pulse is generated internally in the body. Since the electrical pulse is generated internally, it is more efficient at simulating deep muscle tissue than an external electrical pulse. Daily, short-term simulation with this alternating magnetic field intensity can be used to maintain both slow twitch and fast twitch muscle fibers when the frequency is swept from 18 to 70 Hz. This therapy is similar to exercise in water except the patient is levitated in a magnetic field and there is no danger of drowning or having the wounds become wet. This internal magnetic stimulation of muscle groups can also be used to treat constipation in patients by simulating the parasympathetic nervous system of the large intestine. Diabetic patients can benefit from internal magnetic stimulation for increase in circulation and treatment of symptomatic diabetic neuropathy of the lower extremities such as the feet.

When transplanting nerve tissue for repairing nerve damage, electrical stimulation of damaged nerves, including the effected muscle groups, greatly enhances the probability of muscle group re-innervation and significantly reduces muscle atrophy. The magnetic field can stimulate deep muscle groups even if there is a cast on the limb due to an associated bone injury. For stroke victims with chronic nerve damage, stimulation of the effected muscle groups and nerves with a swept frequency (30-120 Hz) magnetic field can help with nerve repair and maintain and improve muscle strength. For patients with fibromyalgia, higher swept frequency (100-180 Hz) magnetic stimulation of affected areas will help reduce the sensation of pain and numb the pain caused by pressure on these affected areas. This treatment is also beneficial for stroke victims.

Douglas et al (Journal of Physics Special Topics; "A2_3 Diamagnetic Levitation of a Human"; Douglas G. J. M, Marshall D. A., Griffiths I., Hands T. O.; Department of Physics and Astronomy, University of Leicester, Leicester, LE1 7RH; Nov. 8, 2011 (https://physics.le.ac.uk/journals/index.php/pst/article/view/430/301) teach how to calculate the strength of a magnet in Tesla units (T) required to levitate an adult human by diamagnetic levitation. John Schenck, Med. Phys. 23(6), June 1996, pages 815-850, "The role of magnetic susceptibility in magnetic resonance imaging: MM magnetic compatibility of the first and second kinds" gives actual magnetic susceptibilities for water, lipids, bone and average human tissue of −9.05 ppm, −10.0 ppm, −12.8 ppm and −11 to −7 ppm respectfully. Douglas et al state that humans are composed of about 60% water and the balance of 40% is lipids and bone. The average density of the human body, Pave, is 1100 kg/m$^3$, 10% greater than that of water. Based on those values, the magnetic force $F_B$ and gravitational force Fg must balance to levitate.

$$F_g = \rho_{ave} V_o g, \tag{1}$$

Above, equation (1) gives us the force exerted on a person due to Earth's gravity, where $V_o$ is the volume of the object and g is the approximate gravitational acceleration 9.81 m/s$^2$ on the Earth's surface.

The below expression, equation (2), gives the magnetic force as the product of the magnetization of the sample, M, and the gradient in the magnetic field, $\nabla B$, $$F_B = M \cdot \nabla B, \tag{2}$$

meaning equations (1) and (2) can be equated. By then substituting in for the magnetization, using equation (3), the volume term in equation (1) is canceled using the assumption that the volume of water, $V_{H2O}$, is 100% of the total volume, $V_O$; 1.1 factor accounts for fat and bone content;

$$M = \frac{\chi_D V_{H2O} B}{\mu_0} = 1.1 \frac{\chi_D V_o B}{\mu_0} \tag{3}$$

Douglas et al state that $\chi_D$, the diamagnetic susceptibility of water, is 9.035×10$^{-6}$ m$^3$/kg and $\mu_o$ is the permeability of free space (4π×10$^{-7}$ H/m).

$$1.1 \frac{\chi_D V_o B}{\mu_0} \nabla B = \rho V_o g. \tag{4}$$

Concerning the force acting against gravity, $\nabla B$ is defined as equal to dB/dz where z is the vertical direction. Thus, rearranging equation (4) provides:

$$B = \frac{dB}{dz} = 0.91 \frac{\rho_{ave} g \mu_0}{\chi_D}, \tag{5}$$

by comparison, the B dB/dz value of water is given as 1400 T$^2$/m whereas using values for a human, 2501 T$^2$/m for the human.

By then integrating over both dB and dz, a peak magnetic field strength is obtained:

$$\int B dB = 0.91 \frac{\rho_{ave} g \mu_0}{\chi_D} \int dz, \tag{6}$$

$$B^2 = \frac{1.82 \cdot \rho_{ave} g \mu_0}{\chi_D} z, \tag{7}$$

Then, by then substituting in the given values and a z value of 0.25 m (approximately the thickness of an adult male human or the height of the human lying down), we get that B is equal to 26.1 Tesla. Thus, a human can be diamagnetically levitated horizontally with a magnetic field strength of 26.1 Tesla (23-30T). Magnets of this strength are feasible to build as disclosed in U.S. Pat. No. 7,609,139 and in US Publication No. 2008/0242551. If the human's feet are supported then only one half the 23-30T would be required to main levitation.

FIG. 1 illustrates the diamagnetic levitation system 10 of the present invention. The diamagnetic levitation system 10 has a superconducting magnetic device 11 consisting of a plurality of independently mechanically controlled segments 12, preferably 4-16 segments. The segments 12 are open torus magnets having a first arm 13 and a second opposite arm 14 extending upward from a central base portion 15. There is a gap 19 between the free ends of first arm 13 and second opposite arm 14. The first arm 13 and the second arm 14 are superconducting magnets. The free end of first arm 13 is shown as having a north (N) polarity and the free end of the second opposite arm 14 is shown as having a south (S) polarity. The central base portion 15 can also be a superconducting magnet but, preferably, is an electromagnet. A chamber 16 is positioned within the gap 19 of the superconducting magnetic device 11. The chamber 16 may have supporting elements 17 so that it is positioned within the gap 19 and does not rest on the free ends of the arms 13 and 14. The arms 13 and 14 define a hollow void 18. The supporting elements for the chamber 16 may also be in the void space 18 of the superconducting magnetic device 11.

Figure 2:
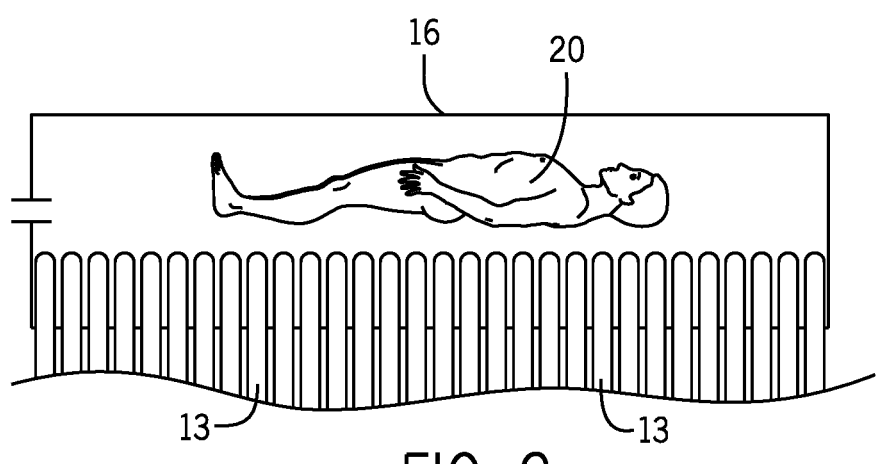
FIG. 2 shows a partial sectional side view of the diamagnetic levitation system with a human patient in a chamber, with the human patient being levitated by the superconducting magnetic device.

FIG. 2 shows a partial sectional side view of the diamagnetic levitation system 10 with a human patient 20 in chamber 16 levitated by the superconducting magnetic device 11. Air jets (not shown) may be provided on the bottom of the chamber 11 to circulate air or other gases, such as oxygen, through chamber 11. The air jets may also be used to remove waste products from the chamber 11. The chamber 11 can be compartmentalized to deliver air to the head of the patient 20 and to deliver another gas to another part of the body. For example, ozonated air may be delivered to a wound for sterilization. Also shown is a vent 21 to vent air and other gases from the chamber 16.

Figure 3:
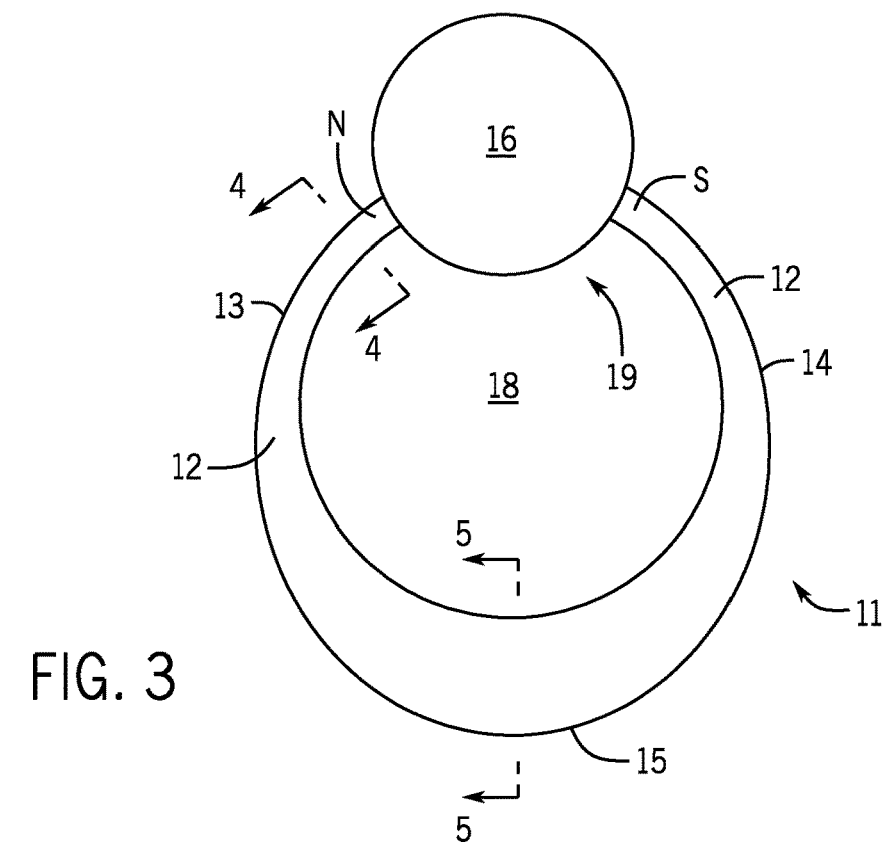
FIG. 3 shows a front view of a magnet segment with the chamber positioned in the gap created by the free ends of arms of the magnet segment.
Figure 4:
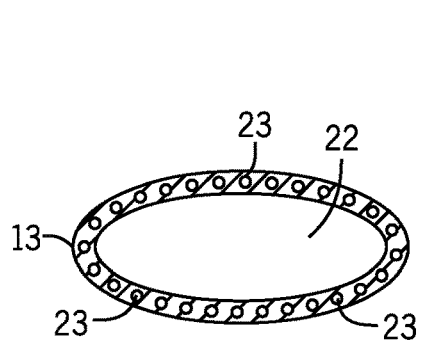
FIG. 4 shows a sectional view through line 4-4 of FIG. 3, illustrating the shape of the arms, the core, and the coils.
Figure 5:
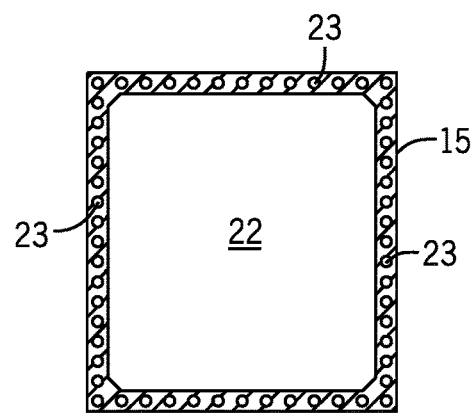
FIG. 5 shows a sectional view through line 5-5 of FIG. 3, illustrating the shape of the central base portion, the core, and the coils.

FIG. 3 shows a front view of a magnet segment 12 with the chamber 16 positioned in the gap 19 created by the free ends of arms 13 and 14. The diameter of the magnetic segment 12 ranges from 2 ft for small objects, such as cells, tissues, or organs, to 5 ft in diameter for human levitation. FIG. 4 shows a sectional view through line 4-4 of FIG. 3, illustrating the shape of the arms 13 and 14, the core 22, and the coils 23. FIG. 5 shows a sectional view through line 5-5 of FIG. 3, illustrating the shape of the central base portion 15, the core 22, and the coils 23. The thickness of the arms 13 and 14 is thin and flat near the ends of the arms 13 and 14. This allows the super conducting magnetic coil of the first arm 13 to make a thin plane of a very high magnetic field as the magnetic field crosses the chamber 16 to the opposing super conducting magnetic coil of arm 14. The coil direction should be level at the walls of the chamber to prevent spreading of the magnetic field. The super conducting coils are used to compress the magnetic field into a thin plane. The electro-magnetic control coil on the central base portion 15 is used to oscillate the DC magnetic field created by the super conducting coils. The metal core shape in the electro-magnetic coil on the central base portion 15 is near square with round corners to prevent magnetic field leakage. The electro-magnetic coil 15 does not compress the magnetic field.

The thickness of the metal core of the magnet ranges from a flattened plane or oval shape at the free end of first arm 13 and the free end of the second opposite arm 14 (approximately 0.3 to 2 inches thick) to a 6 to 10 inch thick square cross section at the base 15 where the conventional electromagnetic coil is located. Preferably, this is an eight to one reduction in magnetic core volume going from the free ends of the arms 13 and 14 to the base 15. The magnetic field compression can only happen with a superconducting coil surrounding the thinning magnet metal core. The superconductor can compress magnetic field lines in air or in metal.

The layers of superconducting windings increase towards the gap 19, because more superconducting material is required to compress the magnetic field lines. The objective is to increase the magnetic field strength from 1-2 Tesla to 23-30 Tesla at the gap 19 or chamber wall. The magnetic field lines leave the superconducting compressed north pole (N) compressed and begin to expand in the air filling the chamber. The diamagnetic object, such as the human body, does not significantly change the path of the magnetic field lines. Then, the magnetic field lines traverse to the south pole (S) where they are compressed again to journey through the metal core back to the north pole (N).

The concept of using an open torus-shaped core with a gap saves from 1.9 to 3.5 times the energy needed to operate a closed torus-shaped core without a gap. The savings is based on the superconducting material used in the final magnetic field compression. For example, a lower performing (cheaper) superconducting material as the outer layer of the superconducting coil is used to start the magnetic field compression. Then, when magnetic field strength exceeds the performance of the 'cheaper' superconducting material, the next higher performing layer is added to the superconducting coil next to metallic core. Finally, the last layer of the most expensive superconducting material is added to the superconducting coil near the chamber wall to achieve maximum compression as the magnetic field leaves the north pole (N) and returns to the south pole (S).

Figure 6A:
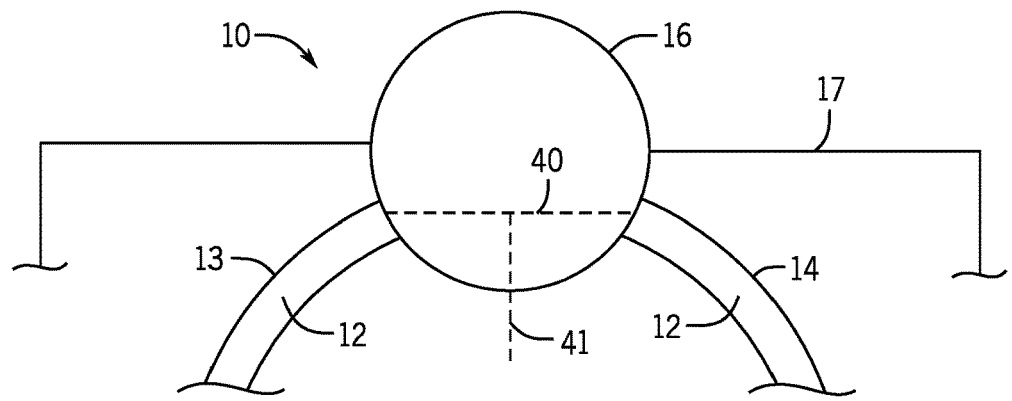
FIGS. 6a-c shows a front sectional view of the upper portion of the diamagnetic levitation system, further showing the DC component of the magnetic field path from an open torus-shaped magnet segment, and further showing that the magnet segment can be rotated around the chamber for self-centering a diamagnetic object.
Figure 6B:
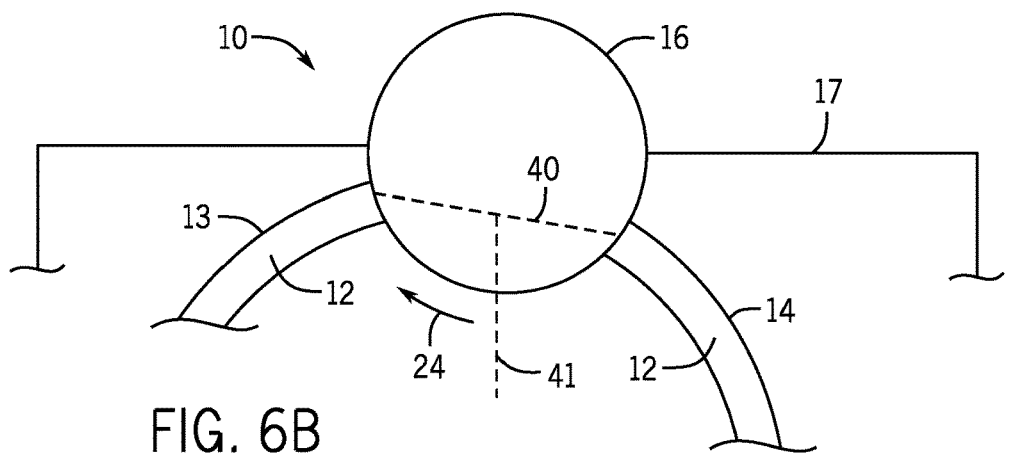
Figure 6C:
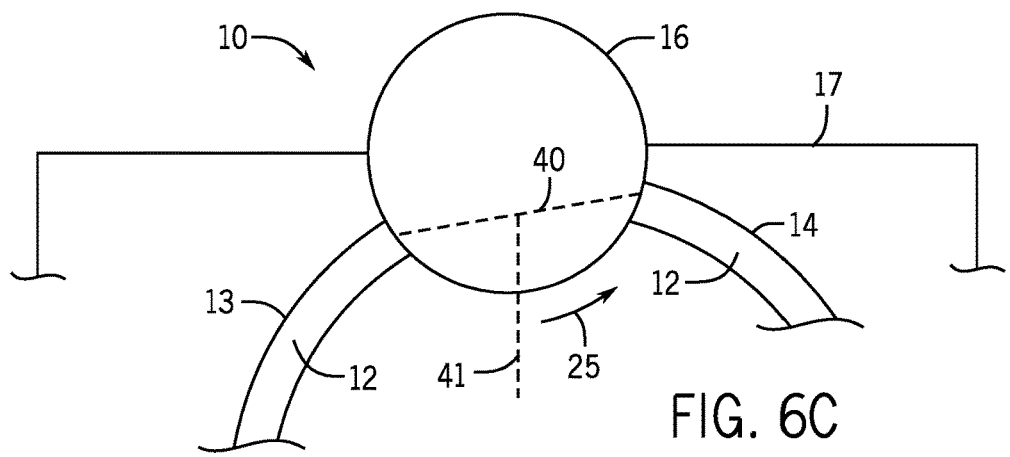

FIGS. 6a-c shows a front sectional view of the upper portion of the diamagnetic levitation system 10. In FIG. 6a the arms 13 and 14 of segment 12 are positioned so that the ends of arms 13 (N) and 14 (S) will form a planar DC magnetic field 40 perpendicular to the line of gravity 41. FIG. 6b shows that the segment 12 can be rotated clockwise, shown by arrow 24, so that the planar magnetic field 40 is tilted in one direction and is no longer perpendicular to the line of gravity 41. FIG. 6c shows that the segment 12 can be rotated counterclockwise, shown by arrow 25, so that the planar magnetic field 40 is tilted in an opposite direction and also is not perpendicular to the line of gravity 41. In order to stabilize an object in the center of the chamber 16 the magnetic field needs to be slightly curved up near the chamber walls. To make a "curved" magnetic field near the chamber wall, every other magnet segment 12 is tilted slightly clockwise or counterclockwise to make the curved magnetic field shape next to the chamber wall. The superconducting magnetic device 11 is held in a frame (not shown) in order to control reactionary forces. The magnet 11 is rotated in the frame to make the clockwise and counterclockwise tilt in the magnetic field.

The torus shaped magnets of segments 12 have coils 23 which shape the superconducting magnetic field into a flat ellipse. The coils 23 are powerful enough to create a very sharp change in the magnetic field strength traversing the lower third of the chamber. This planar shaped magnetic field allows diamagnetic objects to be supported in free space. Diamagnetic objects can include animals, plants, organic polymers, or aqueous fluids. The torus shape of the magnet allows the magnetic field from the opposing superconducting coils to be contained inside the chamber. This design provides the magnetic shielding needed to operate in a building or hospital environment. The core 22 of the torus magnet of each segment 12 is made of metal alloy material such as supermendur or supermalloy to contain high magnet field strength of 2 T or more outside of the chamber. The metal core quickly thickens in shape as the arms 13 and 14 extend away from the chamber to capture leaking magnetic flux and magnetically shield the environment outside of the chamber. The magnetic field is concentrated only across the chamber gap in the torus. To stabilize an object in the center of the chamber, segments 12 of the magnet must be rotated to ramp up near the walls of the chamber so the object can slide down to the center line of the chamber. Each torus magnet segment 12 is simply offset from center by +/−2-5 degrees alternating down the length of the chamber for self-centering of the diamagnetic object. Each segment 12 can be rotated to centralize a diamagnetic object in the chamber. With a slight slope at each side of the chamber the diamagnetic object will tend to position itself along the center line of the chamber because magnetic levitation is near frictionless.

The open torus magnet has two superconducting coils 13 and 14 to compress the magnetic field down to a flat ellipse on the ends, and has a control electromagnet coil in the central base portion 15 which operates to oscillate the DC magnetic field of the two superconducting coils when the control electromagnet is turned on. The torus magnet segments 12 can be rotated about the chamber independently to control the location of the magnetic field in the chamber. The superconducting coil magnetic field strength should range, preferably, from 23 to 30 Telsa depending on the density of the body part being levitated. Electromagnetic control coil 15 oscillation frequency ranges, preferably, from 10 to 300 Hz for sine waveforms and from 100 to 500 Hz for square waveform pulses. The wave form is symmetric in amplitude both positively and negatively. The torus magnet is externally shielded with permendur or superpermendur alloy tape to prevent magnet flux leakage. The magnetic permendur or superpermendur alloy core is thick enough in the central base portion 15 of the magnet to contain all the flux from the two superconducting coils, thereby preventing any magnetic flux leakage.

The open torus magnets 12 are assembled so that a chamber can be inserted in the gap of the torus magnets. Chamber walls are constructed from non-magnetic and non-diamagnetic material such as ceramic or glass so that the wall will not interfere with the magnetic field lines from the superconducting coils. The chamber may have air jets in the lower ⅓ of the chamber to inject breathable air or air containing a biocide such as ozone gas or atomized liquid.

The chamber may have two air exits, one for breathing air and the other for air containing a biocide and waste products from the body.

The electromagnetic coil 15 controls the oscillations of each torus magnet segment. The oscillations may have a sine wave form and a frequency ranging from 10 to 40 Hz to flex the skeletal structure of the body for bone repair. The oscillations may have a square pulse wave form and a frequency range from 100 to 200 Hz, with a pulse delay time from 20 to 60 Hz, to stimulate muscle groups to prevent atrophy of the muscle. The oscillations may have a square pulse wave form and a frequency range from 200 to 300 Hz, with a pulse delay time from 90 to 150 Hz, to stimulate damaged nerves or nerves that are being repaired. The oscillation frequency can be swept over the ranges and the oscillations can have a quiet period for the muscle fiber or nerve fiber to regenerate before the next stimulation treatment. Electrical stimulation of tissue can be performed with surface electrodes. The current path between the electrodes can be modified by the magnetic field so that the electrical pulse would simulate deep muscle fibers or deep nerve paths.

Using the chamber, muscle tissue and skin can be grown over cartilage to make finger, nose, ear, and face shapes to replace damaged body parts. After growing the body part, it would be transplanted to the patient. Cartilage shapes would be ossified to bone with gene therapy after transplanting to the patient. For large bone replacement such as a limb, the patient can remain in the chamber until the ossification-integration process would support the weight of the limb.

Using the electromagnetic coil 15 magnetic/electrical pulsing (oscillation) technique, transplanted organs or body parts can be reintegrated into the body by stimulating nerve pathways between the transplanted tissue and the patient body. Medical leeches can be used in the chamber on the transplanted part to promote blood vessel repair.

Although the chamber is shown as closed, it may also have an open configuration. In an open chamber surgery can be performed on a patient in a stress-free environment by levitating the patient. The levitation will help prevent spinal cord damage by relaxing the spine and reducing the compressive stress on the bursa. The levitation will prevent movement of the spinal cord, even if a vertebra or bursa was removed from the spinal column.

Figure 7:
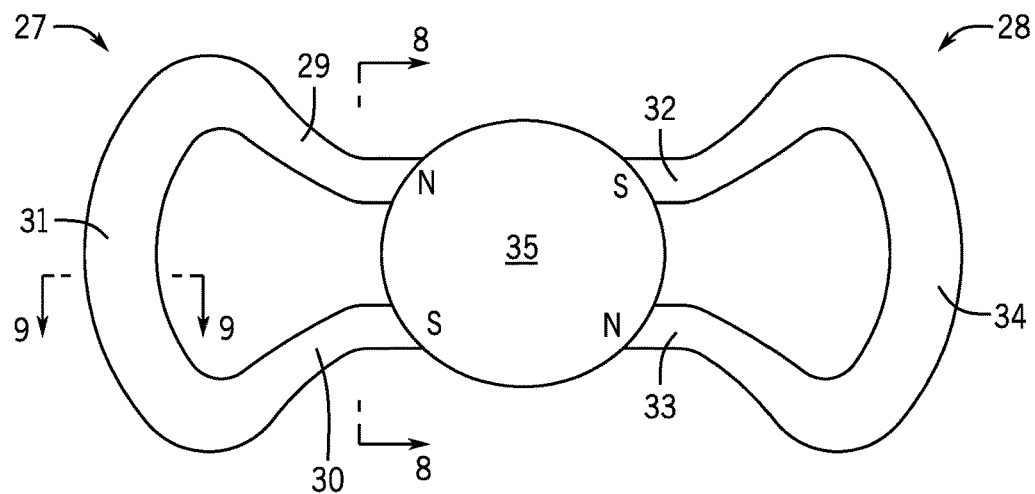
FIG. 7 shows a first horseshoe-shaped super conducting magnet and a second opposite similar horseshoe-shaped super conducting magnet with a chamber therebetween.

FIGS. 7-10 show an alternate embodiment 26 of the diamagnetic levitation system 10 of the present invention. FIG. 7 shows a first horseshoe-shaped super conducting magnet 27 and a second opposite similar horseshoe-shaped super conducting magnet 28 with a chamber 35 therebetween. Magnet 27 has a first arm 29, a second arm 30 and central base portion 31. Magnet 28 has a first arm 32, a second arm 33, and central base portion 34. The magnets 27 and 28 are positioned opposite each other with a chamber 35 positioned in between them. Magnet 27 is shown with the end of the first arm 28 as having a north (N) polarity and the end of the second opposite arm 29 as having a south (S) polarity. Magnet 28 is shown with the end of the first arm 32 as having a south (S) polarity and the end of the second opposite arm 33 as having a north (N) polarity. The magnets 27 and 28 are constructed similar to the magnet 11 shown in FIGS. 1-6*a-c*. The arms 29, 30, 32, and 33 are superconducting magnets (coils) and central base portions 31 and 34 have electromagnets. Although not shown, the diamagnetic levitation system 26 is composed of a plurality of segments, each similar to magnets 27 and 28. These segments are rotatable as is described for segments 12 in the diamagnetic levitation system 10.

Figure 8:
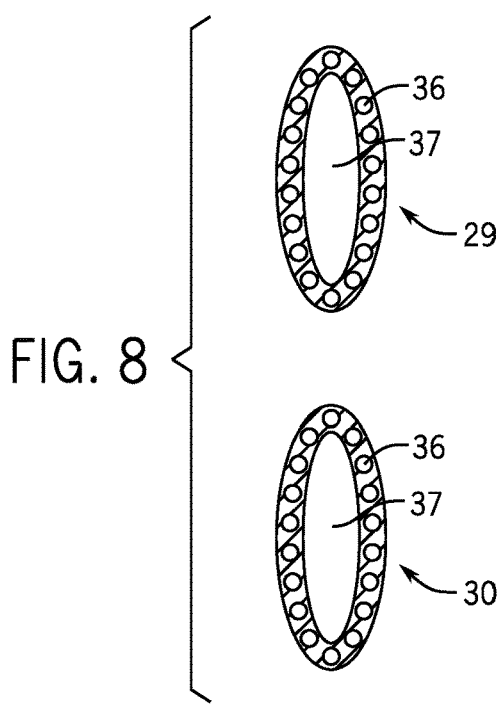
FIG. 8 shows a cross section view along lines 8-8 in FIG. 7, illustrating the core wires around the core.
Figure 9:
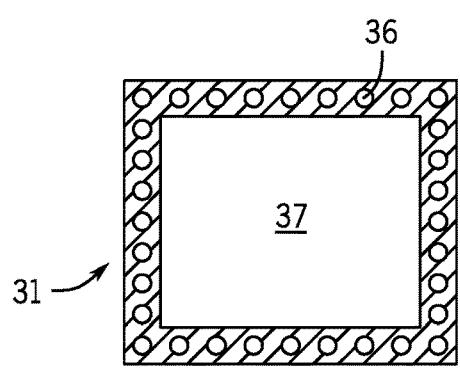
FIG. 9 shows a cross section view along lines 9-9 in FIG. 7, illustrating the core wires around the core.
Figure 10:
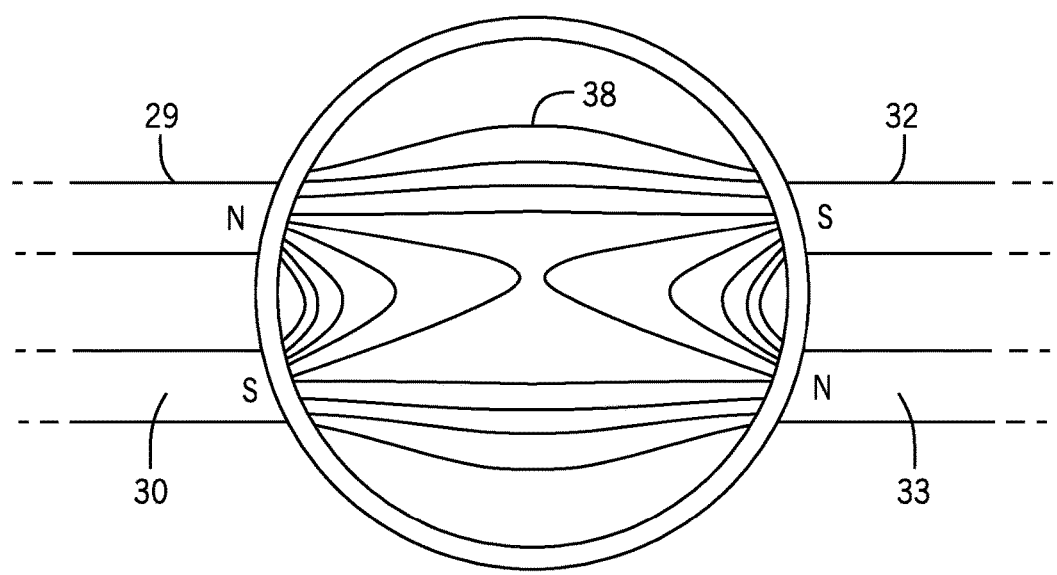
FIG. 10 shows an enlarged view of the chamber and the free ends of the arms of the horseshoe-shaped super conducting magnets adjacent the chamber.

FIG. 8 shows a cross section view along lines 8-8 in FIG. 7, illustrating the core wires 36 around the core 37. FIG. 9 shows a cross section view along lines 9-9 in FIG. 7, illustrating the core wires 36 around the core 37. FIG. 10 shows an enlarged view of the chamber 35 and the ends of arms 29, 30, 32, and 33 adjacent the chamber 35. Magnetic field lines 38 are shown extending from the north poles (N) to the south poles (S). The superconducting coils 29, 30, 32, and 33 are used to compress the magnetic field 38 before the magnetic field 38 enters and exits the chamber 35. The magnetic field 38 of the diamagnetic levitation system 26 is a very uniform plane that can be used to move nanoparticles in the body towards a specific site, such as a tumor, or stimulate a specific muscle group.

The segment magnet can have a double horse-shoe shape with 4 superconducting coil ends with the north pole of one horse-shoe magnet facing the south pole of the other horse-shoe magnet. This magnetic shape has a more uniform field for controlling nanoparticles in the blood stream. The magnetic field strength from the superconducting coils should range from 11 to 15 Telsa.

Diamagnetic or paramagnetic nanoparticles can be injected into the blood stream and manipulated with the magnet segments to group the particles in and around a tumor in the body. The particles can be coated with polymers that have a water wet surface. After a specific amount of time the polymer will dissolve leaving an oil-coated surface, allowing the particles to adhere to the blood vessel wall. The particles can release a treatment drug into the blood stream after a specific amount of time.

Paramagnetic particles can react with oxygen in the blood after a specific time to become ferromagnetic particles for the purpose of heating the local tissue to kill tumor cells in a high frequency magnetic field generated by an MRI coil.

Using an open form of the chamber in the diamagnetic levitation system shown in FIGS. 7-10, in-vitro fertilization can be enhanced by guiding the released egg to the fallopian tube or guiding a fertilized egg to better place in the uterus instead of landing on an area damaged by scar tissue.

This magnetic field can reduce the stress on a baby in the birth canal of its mother by levitating the mother in the magnetic field. The magnetic field would also levitate the child and related aqueous fluids. The contractions of the uterus can be enhanced by muscle stimulation with electrical pulses from the magnetic field or from electrodes pasted on the surface of the skin.

With respect to the above description then, it is to be realized that the optimum dimensional relationships for the parts of the invention, to include variations in size, materials, shape, form, function and manner of operation, assembly and use, are deemed readily apparent and obvious to one of ordinary skill in the art, and all equivalent relationships to those illustrated in the drawings and described in the specification are intended to be encompassed by the present invention. For example, any suitable type of superconducting magnets and electromagnets can be used. Any suitable type of chamber can be used, or the system can be used without a chamber. The system can be constructed in any desired size and the chamber can be of any desired size or shape. For example, the chamber can be rectangular, round, oval, octagonal, or dome-shaped, and the like. The chamber can hold a plurality of human subjects. Air jets may also be placed on the top or ends of the chamber.

Therefore, the foregoing is considered as illustrative only of the principles of the invention. Further, since numerous modifications and changes will readily occur to those of ordinary skill in the art, it is not desired to limit the invention to the exact construction and operation shown and described, and accordingly, all suitable modifications and equivalents may be resorted to, falling within the scope of the invention.

We claim:
1. A diamagnetic levitation system, comprising:
a) a first horseshoe-shaped magnet segment and a second opposite horseshoe-shaped magnet segment, wherein said first and second horseshoe-shaped magnet segments are superconducting magnets and are positioned opposite each other with a space therebetween;
b) said first horseshoe-shaped magnet segment has a first arm, a second arm, and a central base portion and said second opposite horseshoe-shaped magnet segment has a first arm, a second arm, and a central base portion, wherein said central base portions of said first and second horseshoe-shaped magnet segments are superconducting magnets or electromagnets;
c) said first horseshoe-shaped magnet segment and said second opposite horseshoe-shaped magnet segment form a planar magnetic field in said space, wherein a north pole of a first arm or a second arm of one of said horseshoe-shaped magnet segments faces an opposite south pole of a first arm or a second arm of the other of said horseshoe-shaped magnet segments; and
d) said first horseshoe-shaped magnet segment and said second horseshoe-shaped magnet segment are constructed to levitate a diamagnetic object within or above said space.

2. The diamagnetic levitation system of claim 1 wherein each said superconducting magnet or each said electromagnet of said central base portions of said first and second horseshoe-shaped magnets oscillates said planar magnetic field in said space when operated.

3. The diamagnetic levitation system of claim 1 wherein said first horseshoe-shaped magnet segment and said second opposite horseshoe-shaped magnet segment are rotatable so that said planar magnetic field is tilted away from an orientation perpendicular to the direction of gravity as said first horseshoe-shaped magnet segment and said second opposite horseshoe-shaped magnet segment are rotated.

4. The diamagnetic levitation system of claim 1 further comprising a support for said diamagnetic object, said support being positioned in or near said space.

5. The diamagnetic levitation system of claim 4 wherein said support is a chamber positionable around said diamagnetic object, said chamber being positioned in said space.

6. The diamagnetic levitation system of claim 1 wherein said first horseshoe-shaped magnet segment and said second opposite horseshoe-shaped magnet segment are offset from center by plus or minus 2 to 5 degrees for self-centering of said diamagnetic object in said planar magnetic field.

7. A diamagnetic levitation system, comprising:
a) a first horseshoe-shaped magnet segment and a second opposite horseshoe-shaped magnet segment, wherein said first and second horseshoe-shaped magnet segments are superconducting magnets and are positioned opposite each other with a space therebetween;
b) said first horseshoe-shaped magnet segment has a first arm, a second arm, and a central base portion and said second opposite horseshoe-shaped magnet segment has a first arm, a second arm, and a central base portion, wherein said central base portions of said first and second horseshoe-shaped magnet segments are superconducting magnets or electromagnets;
c) said first horseshoe-shaped magnet segment and said second opposite horseshoe-shaped magnet segment form a planar magnetic field in said space, wherein a north pole of a first arm or a second arm of one of said horseshoe-shaped magnet segments faces an opposite south pole of a first arm or a second arm of the other of said horseshoe-shaped magnet segments; and
d) said first horseshoe-shaped magnet segment and said second horseshoe-shaped magnet segment are constructed to levitate a diamagnetic object within or above said space; wherein each said superconducting magnet or each said electromagnet of said central base portions of said first and second horseshoe-shaped magnets oscillates said planar magnetic field in said space when operated, and wherein said first horseshoe-shaped magnet segment and said second opposite horseshoe-shaped magnet segment are rotatable so that said planar magnetic field is tilted away from an orientation perpendicular to the direction of gravity as said first horseshoe-shaped magnet segment and said second opposite horseshoe-shaped magnet segment are rotated.

8. The diamagnetic levitation system of claim 7 further comprising a support for said diamagnetic object, said support being positioned in or near said space.

9. The diamagnetic levitation system of claim 8 wherein said support is a chamber positioned around said diamagnetic object, said chamber positioned in said space.

10. The diamagnetic levitation system of claim 7 wherein said first horseshoe-shaped magnet segment and said second opposite horseshoe-shaped magnet segment are offset from center by plus or minus 2 to 5 degrees for self-centering of said diamagnetic object in said planar magnetic field.

11. A diamagnetic levitation system, comprising:
a) a first horseshoe-shaped magnet segment and a second opposite horseshoe-shaped magnet segment, wherein said first and second horseshoe-shaped magnet segments are superconducting magnets and are positioned opposite each other with a space therebetween;
b) said first horseshoe-shaped magnet segment has a first arm, a second arm, and a central base portion and said second opposite horseshoe-shaped magnet segment has a first arm, a second arm, and a central base portion, wherein said central base portions of said first and second horseshoe-shaped magnet segments are superconducting magnets or electromagnets;
c) said first horseshoe-shaped magnet segment and said second opposite horseshoe-shaped magnet segment form a planar magnetic field in said space, wherein a north pole of a first arm or a second arm of one of said horseshoe-shaped magnet segments faces an opposite south pole of a first arm or a second arm of the other of said horseshoe-shaped magnet segments;
d) said first horseshoe-shaped magnet segment and said second horseshoe-shaped magnet segment are constructed to levitate a diamagnetic object within or above said space; wherein each said superconducting magnet or said electromagnet of said central base portions of said first and second horseshoe-shaped magnet segments oscillates said planar magnetic field in said space when operated, and wherein said first horseshoe-shaped magnet segment and said second opposite horseshoe-shaped magnet segment are rotatable so that said planar magnetic field is tilted away from an orientation perpendicular to the direction of gravity as said first horseshoe-shaped magnet segment and said second opposite horseshoe-shaped magnet segment are rotated; and e) a support for said diamagnetic object, said support being positioned in or near said space, wherein said support is a chamber positioned around said diamagnetic object, said chamber positioned in said space and wherein said first horseshoe-shaped magnet segment and said second opposite horseshoe-shaped magnet segment are offset from center by plus or minus 2 to 5 degrees for self-centering of said diamagnetic object in said planar magnetic field.

* * * * *